(12) United States Patent
Stieff et al.

(10) Patent No.: US 11,385,134 B1
(45) Date of Patent: Jul. 12, 2022

(54) METHOD AND APPARATUS FOR VEHICLE INSPECTION AND SAFETY SYSTEM CALIBRATION USING PROJECTED IMAGES

(71) Applicant: Hunter Engineering Company, St. Louis, MO (US)

(72) Inventors: Michael T. Stieff, Epworth, GA (US); Timothy A. Strege, Sunset Hills, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 0 days.

(21) Appl. No.: 17/165,227

(22) Filed: Feb. 2, 2021

Related U.S. Application Data

(63) Continuation of application No. 16/990,427, filed on Aug. 11, 2020, now Pat. No. 10,935,465, which is a
(Continued)

(51) Int. Cl.
| | |
|---|---|
| *G01M 17/00* | (2006.01) |
| *G01M 17/007* | (2006.01) |
| *H04N 9/31* | (2006.01) |
| *G01S 13/931* | (2020.01) |
| *G07C 5/08* | (2006.01) |
| *G01S 7/40* | (2006.01) |
| *G01S 17/931* | (2020.01) |

(Continued)

(52) U.S. Cl.
CPC ............ *G01M 17/007* (2013.01); *G01S 7/40* (2013.01); *G01S 7/4026* (2013.01); *G01S 7/4052* (2013.01); *G01S 13/931* (2013.01); *G07C 5/0808* (2013.01); *G07C 5/0816* (2013.01); *H04N 9/315* (2013.01); *H04N 9/3179* (2013.01); *H04N 9/3185* (2013.01); *H04N 9/3194* (2013.01); *G01S 7/4086* (2021.05); *G01S 7/497* (2013.01); *G01S 13/867* (2013.01); *G01S 17/931* (2020.01); *G01S 2013/932* (2020.01); *G01S 2013/9315* (2020.01)

(58) Field of Classification Search
CPC ...... G01M 17/007; G01S 7/40; G01S 7/4026; G01S 7/4052; G01S 13/931; G07C 5/0808; G07C 5/0816; H04N 9/315; H04N 9/3179; H04N 9/3185; H04N 9/3194
See application file for complete search history.

(56) References Cited

U.S. PATENT DOCUMENTS

| | | |
|---|---|---|
| 6,329,952 B1 | 12/2001 | Grace |
| 6,411,252 B1 | 6/2002 | Grace |

(Continued)

FOREIGN PATENT DOCUMENTS

WO 2015148830 A1 10/2015

*Primary Examiner* — Adam M Alharbi
(74) *Attorney, Agent, or Firm* — Sandberg Phoenix & von Gontard PC

(57) ABSTRACT

A vehicle service system and method to determine spatial parameters of a vehicle, employing a display system under processor control, to display or project visible indicia onto surfaces in proximity to a vehicle undergoing a safety system service or inspection identifying one or more locations, relative to the determined vehicle centerline or thrust line, at which a calibration fixture, optical target, or simulated test drive imagery is visible for observation by a sensor onboard the vehicle.

14 Claims, 3 Drawing Sheets

Related U.S. Application Data continuation of application No. 15/722,913, filed on Oct. 2, 2017, now Pat. No. 10,788,400.

(60) Provisional application No. 62/406,679, filed on Oct. 11, 2016.

(51) Int. Cl.
  *G01S 7/497* (2006.01)
  *G01S 13/86* (2006.01)

(56) References Cited

U.S. PATENT DOCUMENTS

| | | |
|---|---|---|
| 9,491,451 B2 | 11/2016 | Pliefke |
| 2010/0254019 A1 | 10/2010 | Cui et al. |
| 2013/0100290 A1 | 4/2013 | Sato |
| 2015/0073642 A1 | 3/2015 | Widmer et al. |
| 2019/0156600 A1* | 5/2019 | Potyrailo ............. G07C 5/0816 |
| 2019/0392610 A1 | 12/2019 | Cantadori et al. |
| 2020/0074767 A1 | 3/2020 | Cavalli |
| 2021/0003693 A1* | 1/2021 | Jales ....................... G01S 13/86 |

* cited by examiner

METHOD AND APPARATUS FOR VEHICLE INSPECTION AND SAFETY SYSTEM CALIBRATION USING PROJECTED IMAGES

CROSS-REFERENCE TO RELATED APPLICATIONS

The present application is related to, and claims priority from, co-pending U.S. patent application Ser. No. 16/990,427 filed on Aug. 11, 2020, which in turn claims priority to U.S. patent application Ser. No. 15/722,913 filed on Oct. 2, 2017, now U.S. Pat. No. 10,788,400, and which in turn claims priority from U.S. Provisional Patent Application Ser. No. 62/406,679 filed on Oct. 11, 2016, each of which are herein incorporated by reference.

STATEMENT REGARDING FEDERALLY SPONSORED RESEARCH

Not Applicable.

BACKGROUND OF THE INVENTION

The present application is related to systems and methods for the inspection and calibration of vehicle safety systems, and in particular, to vehicle service equipment configured to utilize at least one projector to emit electromagnetic energy during a vehicle safety system inspection or calibration procedure, aiding the placement of a vehicle service fixture relative to the vehicle, or providing vehicle onboard sensors with signal input simulating, to sensors onboard the vehicle, at least a portion of a test drive scenario.

Within the automotive industry there are an increasing number of vehicle manufacturers producing vehicles equipped with onboard sensors such as radar, LIDAR, ultrasonic, and optical systems for monitoring the external surroundings of the vehicles. These systems include Lane Departure Warning systems (LDW), Lane Keep Assist systems (LKA), Blind Spot Detection systems (BSD), collision mitigation braking systems (CMBS), Adaptive Cruise Control systems (ACC), peripheral vision camera systems, reverse camera systems (backup alarms), and night vision camera systems. As vehicle sensor systems become more advanced, the onboard systems rely on input received from these monitoring sensors to provide driver warnings, automate vehicle functions (such as parallel parking), and implement safety features (such as automatic collision avoidance braking and automatically maintaining vehicle spacing).

In order for these various systems to function properly in a vehicle environment, it is necessary to ensure that the vehicle onboard sensors are aligned to specific predetermined or known orientations relative to the vehicle body, such as a centerline, or a direction of vehicle movement, such as a thrust line. If a sensor is misaligned, data acquired may not represent the presence of an object which is adjacent to, or approaching the vehicle, or may be insufficient to identify the location of observed objects. Failure to detect or properly identify observed objects may lead to situations in which warnings are not provided by the vehicle, and corrective actions are not taken, or alternatively, to situations in which warnings or corrective action are provided or taken in error. Failure of such an onboard vehicle system to properly detect and locate objects in the vicinity of the vehicle could lead to collisions between the vehicle and the object.

Some automotive manufacturers have established requirements for the alignment or calibration of the various vehicle sensors which observe or monitor the vehicle external environment. These requirements may necessitate the placement of observable or reflective calibration targets at precise locations relative to an identifiable or measured point on, or associated with, the vehicle. With a calibration target properly positioned, a vehicle sensor can be aligned or calibrated with reference to the observable calibration target.

For example, to perform an aiming or calibration procedure for a vehicle equipped with a safety system employing radar devices concealed in inconspicuous locations, such as at the front of the vehicle or behind the vehicle rear bumper cover, manufacturers may require the vehicle to be positioned on a level surface with a radar-reflective target placed at a specific distance of up to eight meters from the portion of the vehicle housing the radar device. The specific distance from the vehicle, and any lateral offset distance from the vehicle center line or thrust line, varies between vehicle models. Typically, a vehicle manufacturer will specify the placement location for the calibration target by providing instructions for measuring specific distances and angles relative to the vehicle. Recognizing the need to position observable or reflective calibration targets in precise locations, it would be beneficial to provide vehicle service technicians with a method and apparatus for aiding in quickly identifying placement locations for calibration targets relative to a vehicle undergoing a service or inspection procedure without requiring the operator to manually measure distances or angles.

In addition to, or independent of the need to position observable or reflective calibration targets in precise locations in proximity to a vehicle undergoing a safety system inspection or calibration procedure, some automotive manufactures have established vehicle safety system inspection or calibration requirements which necessitate that the vehicle be driven on a test drive, during which the various onboard sensors observe the movement of objects and roadway markings in relation to the vehicle. These test drives enable the sensors to "learn" how observations relate to the vehicle motion. Specific test drive durations and requirements vary between vehicle models, and may require specific distances to be driven, and specific speeds to be reached. Additional requirements include achieving at least a minimum duration of travel on a straight-line road.

Recognizing that the requirements for a vehicle test drive may be impractical or impossible for some vehicle service shops, due to geographic location, time restrictions, or local traffic conditions, it would be beneficial to provide vehicle service technicians with a method and apparatus for simulating a vehicle test drive condition to vehicle onboard sensors while the vehicle remains within a vehicle service bay. These vehicle onboard sensors may include optical cameras which observe visible features, or radar units which emit radar signals and receive back reflected energy from various reflective surfaces in the vehicle environment. The simulation operates to provide input to the vehicle onboard sensors in an expected format, emulating the appearance of objects and environments in motion which might be encountered during an actual vehicle test drive on a roadway.

BRIEF SUMMARY OF THE INVENTION

In an embodiment of the present disclosure, a vehicle service system configured to measure or determine one or more spatial parameters of a vehicle undergoing a safety system service or inspection procedure further includes an optical projector configured to project an optical image onto a surface in proximity to the vehicle. A processor of the vehicle service system is configured with suitable software instructions to control the optical projector, to select or render images for projection, and to position and/or orient a projection axis of the optical projector. The processor is further configured with software instructions to operate the optical projector during a vehicle safety system service or inspection procedure in order to project markings onto a floor surface in proximity to the vehicle identifying one or more locations relative to the determined vehicle centerline or thrust line, at which an observable fixture should be placed for observation by a safety system sensor onboard the vehicle.

In a further embodiment of the present disclosure, a vehicle service system configured to measure spatial parameters of a vehicle, such as, but not limited to, a vehicle centerline or a vehicle thrust line, further includes an optical projector configured to project optical video imagery representative of roadway features observed during a vehicle test drive onto a receiving surface in front of a vehicle undergoing a safety system service or inspection procedure within a vehicle service area. A processor of the vehicle service system is configured with suitable software instructions to control the optical projector in order to simulate the visual appearance of roadway features moving relative to the vehicle centerline or thrust line while the vehicle remains stationary within the vehicle service area. The processor of the vehicle service system may be further configured to interface with the vehicle onboard control systems and emulate signals required to simulate movement of the vehicle in synchronization with the projected optical video imagery. Optionally, the vehicle service system is further configured to monitor signals generated by one or more safety system sensors observing the projected optical video imagery, and/or the vehicle on-board controls system, in order to determine if the safety system sensors and/or control system, are responding as expected to the simulated test drive conditions.

In yet another embodiment of the present disclosure, a vehicle service system configured to measure spatial parameters of a vehicle, such as, but not limited to, a vehicle centerline or a vehicle thrust line, further includes a radar emitter configured to emit radar-frequency electromagnetic energy representative of either stationary or moving objects within a field of view of a radar system onboard a vehicle undergoing a safety system service or inspection procedure within a vehicle service area. A processor of the vehicle service system is configured with suitable software instructions to control the radar emitter in order to simulate the radar reflections of objects moving relative to the vehicle centerline or thrust line while the vehicle remains stationary within the vehicle service area. The processor of the vehicle service system may be further configured to interface with the vehicle onboard control systems and emulate signals required to simulate movement of the vehicle in synchronization with the emitted radar signals. Optionally, the vehicle service system is further configured to monitor signals generated by one or more radar systems onboard the vehicle, and/or the vehicle on-board controls system, in order to determine if the radar systems and/or control system, are responding as expected to the emitted radar signals.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
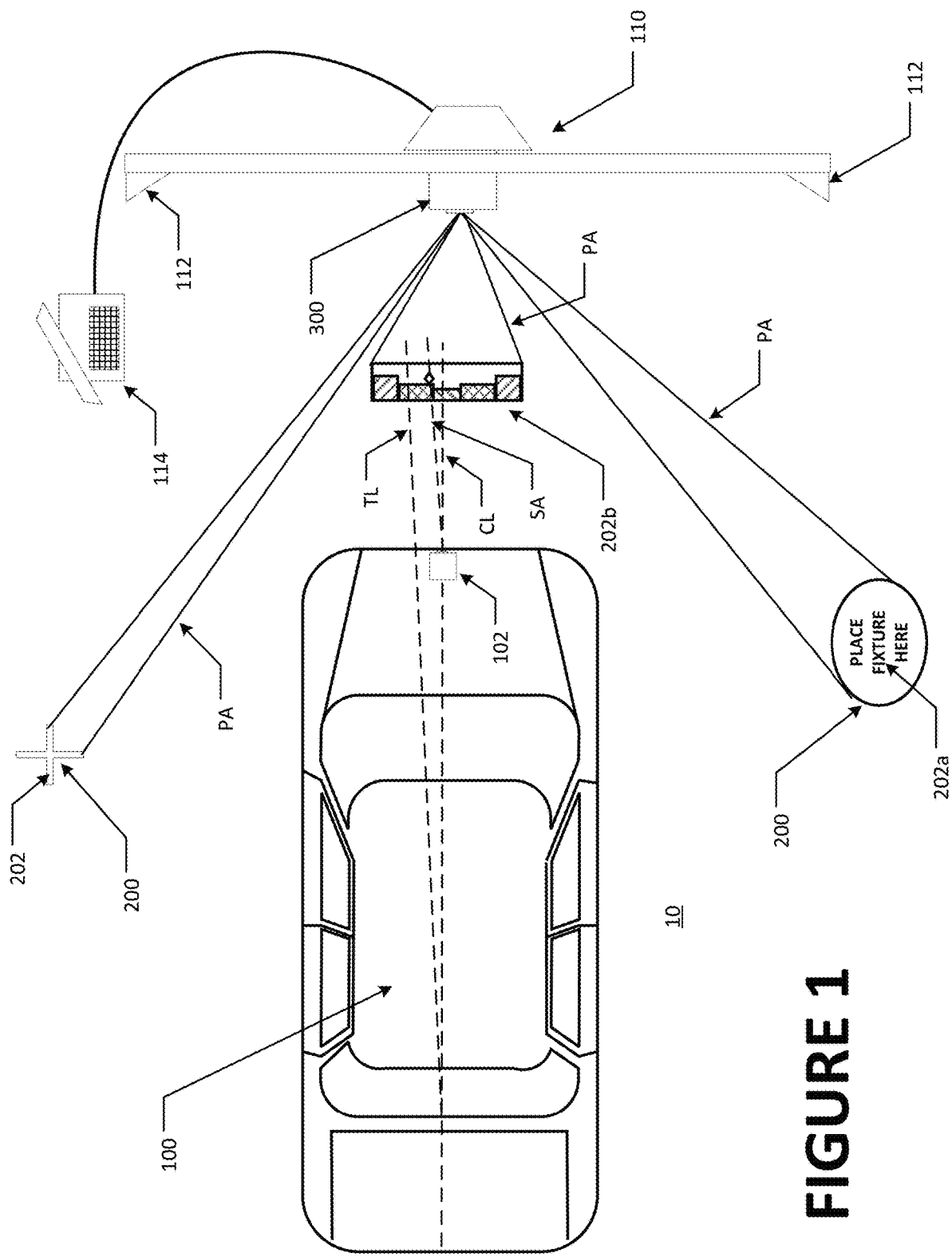
FIG. 1 is a top plan view of a vehicle service bay associated with a vehicle service system and optical projector of the present disclosure, illustrating exemplary observable indicia projected onto surfaces by the optical projector.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Procedures of the present disclosure for facilitating, during a vehicle service or inspection, the alignment and calibration of vehicle onboard sensors which monitor or observe the external environment surrounding the vehicle, such as radar, LIDAR, infrared, or optical sensors used for blind spot monitoring, cross-traffic monitoring, lane departure warnings, collision avoidance systems, and automatic cruise control, are illustrated with reference to the accompanying illustrations. It will be understood by those of ordinary skill in the art that these procedures are intended to be implemented while the vehicle body is stationary and disposed on a generally level surface, such as within a service bay or shop environment in which precision measurements associated with the vehicle can be acquired. External access to the vehicle onboard sensors or to the mounting structures in which they are secured is often required, and may necessitate the removal of vehicle components such as bumper covers or access panels prior to beginning any alignment or calibration procedures, depending upon the vehicle manufacturer's guidelines and stated procedures.

Figure 2:
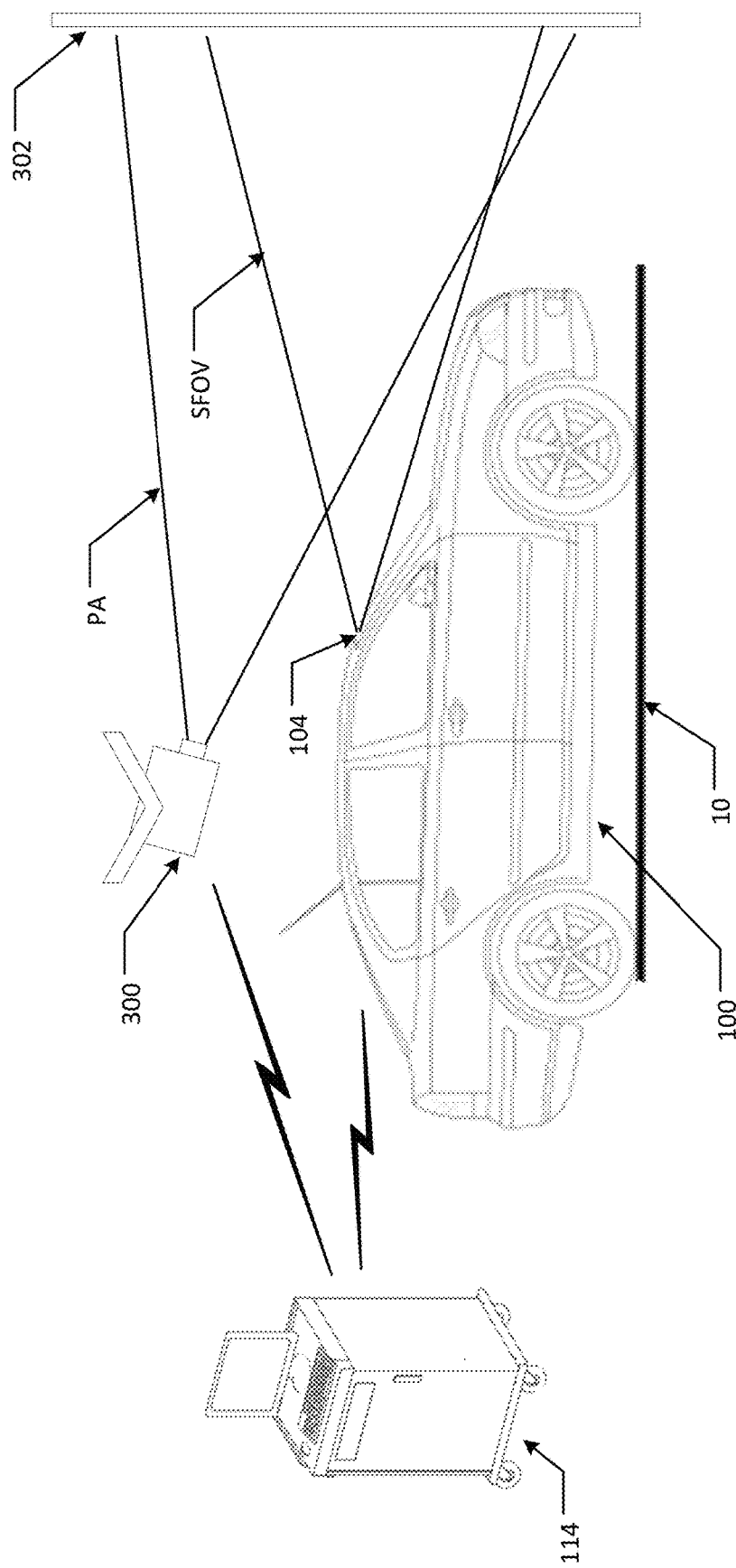
FIG. 2 is a side view of a vehicle service bay associated with a vehicle service system and optical projector of the present disclosure, illustrating video images projected onto a screen in front of a vehicle for observation by a vehicle on-board optical sensor system.
Figure 3:
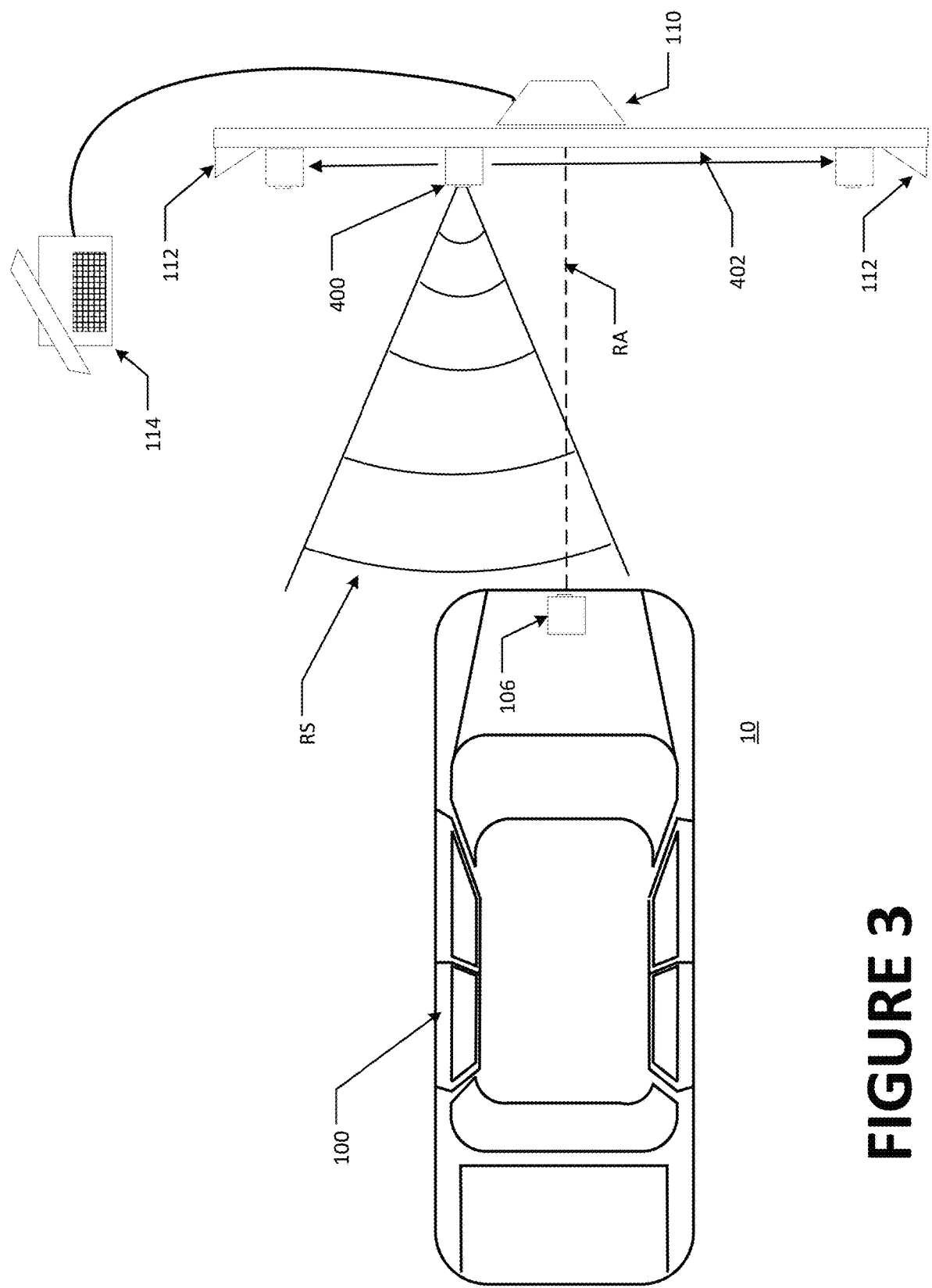
FIG. 3 is a top plan view of a vehicle service bay associated with a vehicle service system and a radar emitter fixture of the present disclosure, illustrating a range of controlled movement for an emitter on the fixture when simulating objects moving off-axis relative to a vehicle based radar sensor system.

In order to conduct alignment or calibration procedures required for many different types of vehicle onboard sensors, it is necessary to place an observable target or calibration fixture for a selected vehicle onboard sensor within a field of view for the selected sensor, at one or more manufacturer-specified locations 200 which are relative to the stationary vehicle. In a first embodiment illustrated with reference to FIG. 1, a procedure of the present disclosure for positioning such an observable target or calibration fixture begins by moving the vehicle 100 into a vehicle service area 10, such as a shop service bay or inspection lane, within which measurements associated with parameters of the vehicle 100 can be acquired. One or more parameters of the vehicle 100 are measured within a spatial frame of reference, such as by a vehicle wheel alignment measurement system 110 consisting of suitable measurement sensors 112 and having a processor 114 configured with software to interact with the measurement sensor and various output devices for conveying information to an operator or external systems. The processor 114 may be contained within a separate console, such as shown in FIGS. 1-3, or may be contained within the same structure as the measurement sensors 112. An exemplary alignment measurement system is a HawkEye Elite™ Alignment system, manufactured and sold by Hunter Engineering Company of St. Louis, Mo., but those of ordinary skill in the art will recognize that any of a variety of vehicle measurement systems may be utilized, provided that the system used is capable of establishing a location of the vehicle 100 within a spatial frame of reference. The vehicle measurement system 110 is preferably machine-vision based, and configured to measure parameters which include, but are not limited to, the vehicle centerline CL, the vehicle thrust line TL, and the position of one or more of the vehicle wheels or body panels.

Once the location of the vehicle 100, or a specific point on the vehicle such as a position of a vehicle onboard sensor, is established within the spatial frame of reference, the manufacturer-specified location 200 for the observable target or calibration fixture is determined relative to the vehicle 100 or identified point within the same spatial frame of reference. Often, the manufacturer-specified location 200 will correspond to a location which is displaced along, or laterally from, an orthogonal axis originating at a specific point on the vehicle 100, such as the front or rear bumper centerline CL. An operator or service technician is traditionally required to determine the axis in question, and then utilize a measuring tape to traverse a specified distance, such as eight meters, along that axis together with any required lateral displacement, to reach the manufacturer-specified location 200 for the observable target or calibration fixture placement. In an improvement to the traditional techniques, a machine vision vehicle inspection system can be configured to observe the relative position of a reference target associated with the observable target or calibration fixture, and guide the operator to the correct placement position.

With a method of the present disclosure, the need for an operator to utilize measuring tapes, or to identify a placement axis along which an observable target or calibration fixture must be moved, is eliminated by the use of an optical projection system 300 under control of the vehicle measurement system 110. Upon identifying the location of the vehicle 100 within the spatial frame of reference, a processor 114 of the vehicle measurement system 110, configured with suitable software instructions, calculates the location within the same spatial frame of reference which corresponds to the manufacturer-specified location 200 for placement of the observable target or calibration fixture relative to the vehicle 100. The optical projection system 300, such as a laser or an image projection system, under control of the processor 114, is activated to project visible or observable indicia 202 onto a surface at the calculated location 200, providing an operator with a visible indication at that location, such as where to place the observable target or calibration fixture.

It will be recognized that a variety of techniques may be utilized to enable the optical projection system 300 to project the visible indication at the calculated location 200 within the vehicle service bay 10. For example, if the optical projection system 300 is configured with a fixed projection field PA, the projection system may be mounted within a motor-driven multi-axis gimbal system, under control of the vehicle service system processor 114. Preferably the projection system 300 is disposed at a location, such as near the service bay ceiling, which provides a clear line of sight towards the vehicle and floor surfaces on which an observable target or calibration fixture may be placed. Once the location 200 for the visible indicia is calculated, the processor 114 generates commands to actuate the motor-drive multi-axis gimbal system to orient the projection field PA towards the calculated location on the floor surface, and activates the projection system 300 to project the selected visible or observable indicia 202 there upon. Alternatively, if the projection system 300 is configured with a steerable projection field, such as MEMS micro-mirrors or adaptive optical elements, the projection field PA itself may be directed towards the calculated location by commands from the processor 114 if it lies within a steerable range of the projection field.

In addition to utilizing the projection system 300 to project visible indicia at a location 200 for the placement of an observable target or calibration fixture, the projection system 300 may be utilized to illuminate or identify specific points on the vehicle 100 to guide an operator or to enable an operator to detect misalignment or displacement of vehicle body panels. For example, the processor 114 may be configured for access to a database containing relative spatial coordinates of various vehicle-specific body dimensions or reference points. Once a vehicle is identified within the vehicle service area, and the location of the vehicle relative to the projection system 300 frame of reference determined, the processor 114 can be utilized to direct the projection system 300 to illuminate one or more points on the vehicle body which should coincide with vehicle body features, such as body panel edges, reference marks, etc. An operator can then compare the illuminated points with the corresponding vehicle body features to determine if there is misalignment or distortion present in the vehicle body, such as may be caused by damage to the vehicle structure. Such illuminated points may further be utilized to aid in the replacement or repair of the vehicle body features by providing a visual guide for use during installation or straightening/repositioning of the vehicle body features.

In yet another alterative configuration, the projection system 300 is configured to project a two-dimensional image which illuminates a large area of the service bay 10, including the calculated placement location 200. To aid in target or fixture placement, the vehicle service system processor 114 is configured to generate an image which includes the selected visible or observable indicia 202 at an image location which will optically project onto the calculated location 200 within the service bay 10 when the generated image is projected by the projection system 300. The vehicle service system processor 114 is configured to direct the projection system 300 to project the generated image into the service bay 10, such that the visible or observable indicia 202 appears at the calculated location 200.

If the vehicle service system includes a measurement system configured to observe surfaces within the service bay 10, the vehicle service system processor 114 may be configured to acquire information representative of the actual three-dimensional surfaces within the area in which visible indicia 202 is to be projected. Exemplary measurement systems may operate by stereo imaging of the surfaces or the imaging of a point cloud of points projected onto the three-dimensional surfaces. Using the acquired information representative of the three-dimensional surfaces, the vehicle service system processor 114 may alter or adjust the shape or configuration of the visible or observable indicia 202 prior to projection by the projection system 300 in order to accommodate for uneven or irregular surface features present at the location 200 at which the visible or observable indicia is to be projected.

Optionally, the vehicle service system processor 114 may be configured to direct the projection system 300 to project a series of discrete images, video imagery, outlined features, dynamic visible indicia, text, messages, optical target elements, or other observable elements onto the illuminated surfaces within the vehicle service bay 10. These messages may include operator instructions, such as seen at 202a in FIG. 1, symbolic guidance, vehicle measurements, warnings, or other visual elements comprising at least a portion of a user interface display. For example, as seen in FIG. 1, measurement bar graph display 202b associated with an axis SA of a vehicle safety system sensor 102 or vehicle thrust line TL can be projected directly onto a floor surface 10 in proximity to the vehicle 100, easily visible to an operator making adjustments to the position or orientation of the vehicle safety system sensor 102. Similarly, optical target elements may be projected onto the various surfaces in the vehicle environment for observation by vehicle on-board optical sensors, replacing or eliminating the need to the placement of physical target structures or calibration fixtures.

In a further embodiment, illustrated in FIG. 2, the vehicle service system is configured to control the projection system 300 to simulate optical conditions a vehicle 100 may encounter during a test drive, as may be required to reset or recalibrate an optical onboard sensor system 104. Simulation of vehicle test drive conditions optionally includes interaction between the vehicle service system processor 114 and vehicle communication paths which convey signals to a vehicle controller during vehicle operation. The vehicle service system processor 114 provides the vehicle controller with signals emulating input which the vehicle controller expects during an actual test drive, while the vehicle 100 remains stationary within the vehicle service bay 10. These expected signals may include, engine state signals, speed sensor signals, transmission gear selection signals, and steering angle signals. Alternatively, the vehicle 100 may be disposed on suitable rolling support surfaces, such as a dynamometer, and/or steering surfaces, such as turn plates, permitting the wheels of the vehicle 100 to roll and/or steer without moving the vehicle body, thereby permitting the vehicle 100 to achieve at least some of the actual operating conditions experienced during a driven road test.

As part of the simulation of the test drive conditions, the vehicle service system processor 114 conveys video data to the projection system 300 to project a simulated test drive environment onto a screen or other projection surface 302 disposed within a field of view SFOV of an optical sensor system 104 onboard a vehicle undergoing a service or inspection procedure. Alternatively, a large-scale active display, such as an LED monitor or e-paper display, may be utilized instead of the projection system 300 and screen 302 without departing from the scope of the disclosure. The simulated test drive environment presented to the optical sensor system 104 includes various animated elements representing conditions which the vehicle 100 may encounter during an actual test drive, including, but not limited to, a road surface, moving and stationary vehicles, pedestrians, landscaping, road surface markings, street signs, and varied lighting or weather conditions. The vehicle service system processor 114 is configured to generate the video imagery to simulate the test drive environment as it would appear to the optical sensor system 104 onboard the vehicle during an actual test drive, with visible objects and features animated to simulate motion within the sensor field of view SFOV in accordance with simulated movement of the vehicle 100.

During a simulated test drive, the vehicle service system processor 114 is operatively coupled to the vehicle communication bus, or alternatively, directly to the output communication lines from the vehicle onboard optical sensor system 104, to receive output signals generated by the vehicle onboard optical sensor system 104 in response to observation of the projection which is simulating the test drive environment. The received output signals are evaluated by the vehicle service system processor 114 to determine if the optical sensor system 104 is functioning within acceptable limits, and/or responding to the simulated test drive environment as expected.

A number of vehicles utilize radar-based sensor systems 106 instead of, or in conjunction with, optical based sensor systems. Calibration or inspection procedures for some radar-based sensor systems require radar reflective targets to be disposed at a significant distance (>eight meters) from the vehicle 100. Placement of a radar-reflective target at these distances may not be possible in a typical vehicle service bay environment. One option is to provide the radar-based sensor systems with reflected or returned radar signals which have been attenuated or modulated to appear as if they are reflected from targets located at the required distance, but which are actually reflected from targets disposed at closer distances, such as shown in published PCT application WO 2015/148830 A1 and in U.S. Pat. No. 6,329,952 B1 to Grace. These reflected or returned radar signals may be Doppler shifted to simulate the appearance of a target which is approaching or receding from the radar-based sensor system onboard the vehicle. However, Doppler shifting only simulates the appearance of a target which is approaching or receding along an axis RA directly in-line with the radar-based sensor system 106.

In order to simulate at least some of the conditions a vehicle 100 may encounter during a test drive, as may be required to reset or recalibrate a radar-based onboard sensor system 106, it is necessary to provide reflected or returned radar signals RS to the radar-based sensor system 106 which are representative of vehicles or objects which are laterally displaced from the vehicle thrust line or center line, and/or which are moving at an angle relative to the vehicle thrust line or center line. For example, returned radar signals RS which are representative of approaching vehicles in adjacent lanes, cross-traffic, or vehicles which are changing lanes in front of the vehicle 100 undergoing the service procedure.

In a further embodiment of the present disclosure, as illustrated in FIG. 3, the vehicle service system incorporates an emitter system 400 configured to emit electromagnetic energy at select frequencies visible to a vehicle onboard radar-based sensor system 106 such as a forward collision avoidance system, a blind-spot detection system, or a cross-traffic warning system. The emitter system 400 is operatively coupled to, and controlled by, the processor 114 of the vehicle service system 110, and is disposed within the vehicle service bay 10 at a location which is within a field of view for the radar-based sensor system 106 onboard the vehicle 100 undergoing testing. To simulate objects approach or receding from the vehicle 100 which are laterally displaced from the vehicle thrust line or axis of detection RA for the radar-based sensor system, the emitter system 400 is mounted to a support frame or track 402 adapted for a limited range of lateral movement, such as transverse to the vehicle thrust line, vehicle centerline, or the radar axis RA, within a horizontal plane. Optionally, the support frame or track 402 may be adapted to further provide for vertical movement in a plane transverse to the vehicle thrust line, center line, or radar axis RA. Under control of the vehicle service system processor 114, the emitter system 400 is moved at least laterally while emitting electromagnetic energy RS towards the vehicle 100 in order to simulate a parallax effect of an offset object approaching towards, receding from, or passing the vehicle 100 as observed by the radar-based sensor system 106 onboard the vehicle. Lateral (and optionally, vertical) movement of the emitter system 400 may be uniform, or may be variable to simulate a changing rate of displacement as an object approaches towards or recedes from, the vehicle 100.

As with simulation of a vehicle test drive condition for an optical onboard sensor system 104, simulation of moving target objects for a radar system 106 onboard the vehicle 100 optionally includes interaction between the vehicle service system processor 114 and vehicle onboard systems which convey signals to a vehicle onboard controller during vehicle operation in order to provide the vehicle onboard controller with signals emulating those which would be expected during actual driving conditions, while the vehicle 100 remains stationary within the vehicle service bay 10. These may include, for example, inertial signals, GPS navigation signals, engine state signals, speed sensor signals, transmission gear selection signals, and steering angle signals. These signals may be emulated either by directly accessing the vehicle data communications bus (for vehicles which are configured with an access point) to inject the required digital signals on appropriate input lines to the vehicle onboard controller, or by providing external (analog) input to the various sensors onboard the vehicle 100 simulating the required environmental conditions. As previously noted, the vehicle 100 may be disposed with the wheels on rolling surfaces, such as a dynamometer, or turning surfaces such as turn plates, permitting actual rolling or steering movement of the vehicle wheels while the vehicle body remains generally stationary, enabling the vehicle onboard sensors to provide at least some of the expected input to the vehicle onboard controller without the need for signal emulation.

As part of the simulation of moving objects for the vehicle radar-based sensor systems 106, the vehicle service system processor 114 is configured with software instructions to generate a movement profile for the emitter system 400 which simulates the motion and radar-reflection appearance of an object moving relative to the vehicle 100 within a field of view of the radar-based sensor system 106. The simulated objects include various elements which a radar-based sensor system 106 may encounter during driving conditions, including, but not limited to, moving and stationary vehicles, pedestrians, street signs, and fixed structures such as buildings, overpasses, and guardrails. The vehicle service system processor 114 controls the emitter system 400 to implement the generated movement profile during the emission of electromagnetic energy at the selected frequencies. Concurrently, through signals from the radar-based sensor system 106 onboard the vehicle 100, or the control system of the vehicle, are monitored by the vehicle service system processor 114 to evaluate responses to the provided input in order to determine if the radar-based sensor system 106 is functioning within manufacturer tolerances.

It will be recognized that while the aforementioned embodiment has been described in the context of a radar-based sensor system 106 onboard the vehicle, similar simulation on moving objects for sensor systems onboard the vehicle which observe other frequencies of the electromagnetic spectrum, such as optical, near infrared, infrared, and far infrared may be implemented using the same principals, using emitters configured to provide signals appropriately tuned for observation by the specific type of sensor system.

In a further embodiment (not shown), a target structure for a vehicle-based LIDAR sensor may be provided on a movable support structure under control of the vehicle service system processor. The target structure is configured to provide a target visible to a vehicle-based LIDAR sensor during testing or calibration of the vehicle systems. The movable support structure incorporates drive mechanisms, such as stepper motors, and associated mechanical components to enable the vehicle service system processor to selectively move the target relative to the vehicle undergoing testing, facilitating testing of the vehicle-based LIDAR sensor to track a moving object. The selective movement may be horizontally transverse to the vehicle direction of travel, simulating cross-traffic, or may be parallel to the vehicle direction of travel, simulating approaching or receding objects along a roadway.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for servicing a vehicle onboard ADAS sensor system, comprising:
　　establishing, with said vehicle service system disposed within a vehicle service bay, a three-dimensional spatial frame of reference, said spatial frame of reference encompassing at least a portion of said vehicle;
　　determining, with said vehicle service system, at least one parameter within said spatial frame of reference which is associated with said vehicle;
　　presenting on a display device of said vehicle service system, observable indicia located by said vehicle service system at a position within said spatial frame of reference which is located in response to said at least one determined parameter associated with said vehicle;

observing, with an onboard vehicle ADAS sensor system having a field of view encompassing said position, said observable indicia; and adjusting a configuration of said onboard vehicle ADAS sensor system responsive to said observation of said observable indicia.

2. The method of claim 1 wherein said at least one parameter associated with said vehicle is a thrust line orientation, a vehicle body centerline orientation, a vehicle body position, or a vehicle wheel position.

3. The method of claim 1 wherein said display device is one of an active display device, a display monitor, or an e-paper display.

4. The method of claim 1 further including, prior to presenting said observable indicia on said display device, presenting operator instructions on said display device directing placement of said display device at said located position prior to presenting said observable indicia.

5. The method of claim 4 wherein presenting said operator instructions includes generating a bar graph representing a spatial relationship between said display device and said located position responsive to said at least one parameter associated with said vehicle, said at least one parameter being one of a thrust line orientation, a vehicle body centerline orientation, a vehicle body position, or a vehicle wheel position.

6. A non-transitory computer-readable medium having stored thereon instructions executable by one or more processors to cause a vehicle service system to perform functions comprising:

establishing a three-dimensional spatial frame of reference, said spatial frame of reference encompassing at least a portion of a vehicle within a vehicle service area;

identifying a characteristic of said vehicle, said characteristic including at least a vehicle model identification;

observing, with a set of measurement sensors, said vehicle to determining at least one measured parameter within said spatial frame of reference associated with said vehicle;

identifying, in response to said determined at least one measured parameter, a position within said spatial frame of reference for display of an optical target observable by an ADAS sensor onboard said vehicle;

selecting an optical target pattern from a set of available optical target patterns in response to said identified vehicle characteristic;

guiding placement of a display device at said identified position; and presenting on said display device, an image of said selected optical target pattern oriented towards said ADAS sensor onboard said vehicle.

7. The non-transitory computer-readable medium of claim 6, wherein said set of measurement sensors are machine-vision vehicle wheel alignment measurement sensors; and wherein said at least one measured parameter is a vehicle alignment measurement.

8. The non-transitory computer-readable medium of claim 7 wherein said vehicle alignment measurement is one of a vehicle thrust line orientation, a vehicle centerline orientation, a vehicle body position, a vehicle wheel position, or a vehicle wheel orientation.

9. The non-transitory computer-readable medium of claim 6 wherein said identified position is further selected in response to said identifying characteristic of said vehicle.

10. A vehicle service system having at least one sensor for acquiring data associated with a vehicle undergoing a service or inspection, a processor configured for evaluating said acquired data, and for identifying a position and/or orientation of a feature of the vehicle relative to said at least one sensor, the improvement comprising:

an active display device located external to said vehicle and within a field of view of a vehicle on-board ADAS sensor; and wherein said processor is configured to control said active display device to present, at a location responsive to said identified position and/or orientation of said vehicle feature, an image of at least one ADAS calibration target pattern to said vehicle onboard ADAS sensor during said service or inspection, said at least one ADAS calibration target pattern selected from a set of ADAS calibration target patterns in response to an identification of said vehicle undergoing said service or inspection.

11. The improved vehicle service system of claim 10 wherein said display device is positionable within said spatial frame of reference.

12. The improved vehicle service system of claim 10 wherein said active display device is a monitor.

13. The improved vehicle service system of claim 10 where said active display device is an e-paper display.

14. The improved vehicle service system of claim 10 wherein said at least one feature of the vehicle is a thrust line orientation, a vehicle body centerline orientation, vehicle body position, or a vehicle wheel position.

* * * * *